DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 3, 1974

926 O.G. 11

T926,008

COPOLYESTER MOLDING COMPOSITIONS OF IMPROVED PROCESSABILITY

James C. Weaver, 720 Teasel Drive, Apt. A3-5, and Robert L. Combs, 4509 Chickasaw Road, both of Kingsport, Tenn. 37660

Continuation of abandoned application Ser. No. 295,622, Oct. 6, 1972. This application Dec. 3, 1973, Ser. No. 420,982

Int. Cl. C08g *39/10*

U.S. Cl. 260—860

No Drawing. 7 Pages Specification

Copolyesters of bisphenol A with terephthalic and isophthalic acids wherein the terephthalate moiety comprises from about 40 to about 75 mole percent of the acid portion, blended with from about 5 to about 20 percent by weight based on total composition of (1) one or more of the poly(phenyl ethers) of the formula

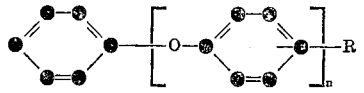

or their isomers, wherein $n=1$–4 and R is selected from H, halogen, phenyl, or lower alkyl of 1–4 carbons substituted phenyl, or (2) p-quaterphenyl exhibit improved processability by way of reduction in necessary processing temperatures and pressures and retain a high level of mechanical properties in the molded article.